United States Patent [19]
Appel

[11] Patent Number: 6,011,576
[45] Date of Patent: Jan. 4, 2000

[54] EXPOSURE CONTROL FOR A RASTER OUTPUT SCANNER IN A MULTICOLOR ELECTROPHOTOGRAPHIC PRINTER

[75] Inventor: James J. Appel, Rochester, N.Y.

[73] Assignee: Xerox Corporation, Stamford, Conn.

[21] Appl. No.: 09/004,537

[22] Filed: Jan. 8, 1998

[51] Int. Cl.[7] ....................................................... B41J 2/47
[52] U.S. Cl. ......................... 347/253; 347/236; 347/240; 347/246; 347/251
[58] Field of Search .................................. 347/236, 237, 347/246, 240, 251, 252, 253, 132; 399/4, 15, 9

[56] References Cited

U.S. PATENT DOCUMENTS

| | | | |
|---|---|---|---|
| 4,265,532 | 5/1981 | McIntosh | 355/20 |
| 4,314,283 | 2/1982 | Kramer | 358/296 |
| 4,321,630 | 3/1982 | Kramer | 358/480 |
| 4,355,882 | 10/1982 | Snelling | 399/4 |
| 4,685,097 | 8/1987 | van der Put | 369/54 |
| 4,868,675 | 9/1989 | Joosten et al. | 358/296 |
| 4,977,414 | 12/1990 | Shimada et al. | 347/247 |
| 4,998,118 | 3/1991 | Ng | 347/236 |
| 5,043,745 | 8/1991 | Inoue et al. | 347/246 |
| 5,325,383 | 6/1994 | Davis et al. | 372/26 |
| 5,341,165 | 8/1994 | Suzuki et al. | 347/132 |
| 5,461,462 | 10/1995 | Nakane et al. | 399/15 |
| 5,497,181 | 3/1996 | Paoli | 347/133 |
| 5,552,863 | 9/1996 | Genovese | 399/152 |
| 5,574,527 | 11/1996 | Folkins | 399/9 |
| 5,600,126 | 2/1997 | Appel et al. | 250/205 |
| 5,654,951 | 8/1997 | Xerox Corporation | 369/97 |
| 5,751,437 | 5/1998 | Xerox Corporation | 358/300 |

FOREIGN PATENT DOCUMENTS

A2 0 355 839   2/1990   European Pat. Off. .

Primary Examiner—N. Le
Assistant Examiner—Hai C. Pham
Attorney, Agent, or Firm—R. Hutter

[57] ABSTRACT

A system controls the laser-induced discharging of pixel-sized image areas on a photoreceptor in a multi-color xerographic printer where multiple layers of toner are placed on the photoreceptor surface. A light collector, disposed to collect light either reflected from or passing through the photoreceptor, detects conditions in which the laser must pass through one or more layers of previously-placed toner to discharge the photoreceptor. When such a condition is detected, the system increases either the intensity or exposure duration of the laser.

6 Claims, 3 Drawing Sheets

EXPOSURE CONTROL FOR A RASTER OUTPUT SCANNER IN A MULTICOLOR ELECTROPHOTOGRAPHIC PRINTER

INCORPORATION BY REFERENCE

The following U.S. patents, all assigned to the assignee hereof, are incorporated by reference: 4,314,283; 4,321,630; and 5,497,181.

FIELD OF THE INVENTION

The present invention relates to laser exposure control for use in a raster output scanner (ROS) for creating electrostatic latent images from electronic data.

BACKGROUND OF THE INVENTION

Electrophotographic "laser" printers, wherein a modulating, scanning laser is projected onto a photoconductive surface to create an image to be printed, are well known. In the case of printers, facsimile machines, and the like, it is common to employ a raster output scanner (ROS) as a source of optical patterns to be imaged on photographic film or an electrostatically charged photoreceptor (a photosensitive plate, belt, or drum) for purposes of printing. The ROS provides a laser beam which switches on and off according to electronic image data associated with the desired image to be printed, exposing the charged photoreceptor point by point as the beam moves, or scans, across its surface. Commonly, the surface of the photoreceptor is selectively imagewise discharged by the laser beam in locations to be printed white, to form the desired image on the photoreceptor. A common technique for deflecting the modulated laser beam to form a scan line across the photoreceptor surface uses a motor-driven rotating optical polygon with multiple reflecting surfaces; the laser beam from the laser source is reflected by the facets of the polygon, creating a scanning motion of the beam, forming a sharply focused scan line across the photoreceptor surface. A closely spaced regular array of scan lines on a photoreceptor collectively forms a raster of the desired latent image. Once a latent image is formed on the photoreceptor, the latent image is subsequently developed with toner, and the developed image is transferred to a print sheet, as in the well-known process of electrophotography.

Recently there has been proposed a general design for an electrophotographic printing apparatus which renders full-color images. Under this proposed architecture, successive layers of different primary-colored toners (typically, black, cyan, magenta, and yellow) are "built up" in imagewise fashion on the same general area of a photoreceptor. When all four different-colored layers are thus placed on the photoreceptor, the set of different-colored toners are in one operation transferred to a sheet of paper, rendering a full-color image thereon. In this architecture, generally known as image-on-image (101) architecture, it will be necessary that a latent image be created on a photoreceptor which will already have at least one layer of toner, from a previously-placed primary-color image, thereon. Thus, the laser which discharges pixel-sized areas of the photoreceptor to render a particular image must pass through one or more previously-placed toner layers in order to discharge a particular small area of the photoreceptor.

The discharging effect of a laser should be uniform whether or not the laser is passing through one or more layers of toner, which in turn means that the intensity of a laser should be increased in areas where the laser must pass through one or more layers of toner. Previously-placed toner will interfere with the transmission of light from the laser to the charged surface of the photoreceptor. Exactly where, within an image to be printed, one or more layers of previously-placed toner will be for a particular portion of a scanline is ultimately dependent on the exact nature of the image being created, and will of course change depending on what specific portion of the image is being printed. There therefore exists a need to monitor and adjust the intensity of a laser discharging any particular portion of a photoreceptor in an 101 color printing apparatus.

DESCRIPTION OF THE PRIOR ART

U.S. Pat. No. 4,265,532 discloses an exposure control device for use in a cathode ray tube, in which a photodetector views the scanning beam passing through different incremental areas of a transparency being reproduced.

U.S. Pat. No. 4,314,283 and U.S. Pat. No. 4,321,630 each disclose a type of elongated light collector suitable for use in measuring the instantaneous intensity of a moving laser beam spot.

U.S. Pat. No. 4,685,097 discloses an exposure control system for a laser printer, in which a light sensing diode is used to determine laser output power, which is then used to adjust the read and write current supplied to the laser by a control circuit.

U.S. Pat. No. 4,868,675 discloses a control circuit for a laser printer which utilizes a laser switching amplifier for supplying current to a laser diode. The control circuit has a correction circuit which compensates for the turn-on delay time of the laser diode. The correction circuit lengthens the incoming image signal which controls the laser diode output by adjusting the duty cycle or operating time.

U.S. Pat. No. 4,977,414 discloses a laser printer in which the laser diode is controlled on the basis of image data and selectable sets of control data stored in memory. The sets of control data are provided to compensate for the predetermined optical characteristics of the optical scanning system.

U.S. Pat. No. 4,998,118 discloses an LED printer, wherein a sensor is provided at the focal plane of a lens used to focus light from the LED junctions onto a film surface.

U.S. Pat. No. 5,043,745 discloses a light-intensity control apparatus. A beam for recording an image is monitored by a detection unit, and the detected output level of the beam is sent to a control unit. The control unit causes the detection unit to sample the light intensity of the beam during an image recording period. The light intensity of the beam is then adjusted during a non-image recording period on the basis of the light intensity monitored during the image recording period.

U.S. Pat. No. 5,325,383 discloses a laser imaging apparatus including a laser diode, the power of which varies as a function of a digital image input signal. The laser diode can be selectably controlled to operate in an amplitude modulation mode, or a pulse amplitude modulation mode.

U.S. Pat. No. 5,497,181 discloses a system for controlling individual spot exposure in a laser printer, wherein the real-time light output of a laser is associated with an integrator which directly controls the pulse width, or exposure duration, of the laser on individual pixel areas in an image being printed.

U.S. Pat. No. 5,552,863 discloses an architecture for a color xerographic printer wherein the laser exposure step includes directing the laser to one side of a photoreceptor belt to effectively discharge the opposite side of the belt; that is, the design exploits the translucence of the belt.

U.S. Pat. No. 5,600,126 discloses an apparatus for monitoring and adjusting the power output of a laser diode in an output scanner, in which light radiated from the back facet of a laser diode is directed onto a pair of back facet photodiodes. Polarization filters can be used to separate the output of individual laser diodes for feedback control.

EP-A2-0 355 839 shows, at FIG. 7 thereof, a raster output scanner in which a detector is used to detect light from an exposing light source which is reflected from the surface of the photoreceptor. However, the photodetector 26 is positioned to receive reflected light only at the start of each scanline (column 7, lines 50–51).

It is known in the art of flash photographic cameras to provide a system wherein a photodetector integrated in the camera monitors light actually reflected from the subject to the imaging lens and terminates the flash when a threshold quantity of light is accumulated by the photodetector.

SUMMARY OF THE INVENTION

According to one aspect of the present invention, there is provided an apparatus for creating an image on a photosensitive surface. There is provided a light source, and means for causing the light source to expose a plurality of image areas forming a scanline on the photosensitive surface. A light collector, extending parallel to the scanline, is disposed to collect light from the light source reflected from the photosensitive surface and cause output of a signal related to the intensity of the reflected light. Means are provided for controlling the exposure of light from the light source on an image area, based on the signal.

According to another aspect of the present invention, there is provided an apparatus for creating an image on a surface of a photosensitive member. There is provided a light source, and means for causing the light source to expose a plurality of image areas on the photosensitive surface. A light collector is disposed to collect light from the light source transmitted through the photosensitive member and cause an output of a signal related to the intensity of the transmitted light.

According to another embodiment of the present invention, there is provided an electrophotographic printing apparatus, comprising a photosensitive member having a surface, a light source, and means for causing the light source to expose a plurality of image areas on the surface of the photosensitive member. Means are provided for placing marking material of a first type on the surface of the photosensitive member. A light collector is disposed to collect light from the light source which interacts with the photosensitive member, and outputs a signal related to the intensity of the interacting light. Means are provided for controlling the exposure of light from the light source on an image area, based on the signal.

DETAILED DESCRIPTION OF THE INVENTION

Figure 1:
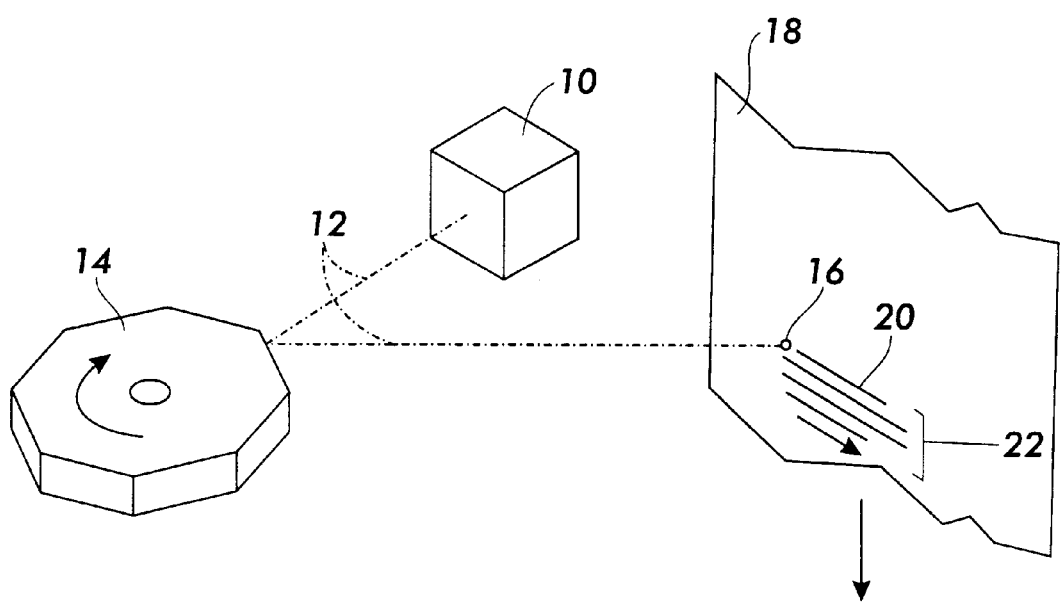
FIG. 1 is a perspective view showing the basic elements of a raster-output scanner (ROS)

FIG. 1 shows the basic configuration of a scanning system used, for example, in an electrophotographic printer or facsimile machine. A laser source 10, which may include a He-Ne laser, or laser diode, produces a collimated laser beam, also referred to as a "writing beam," 12 which is reflected by the facets of a rotating polygon 14. Each facet of the polygon 14 in turn deflects the writing beam 12 to create an illuminated spot 16 on the pre-charged surface of photoreceptor 18, which in this case is a moving belt. Laser source 10 also includes means for modulating the beam 12 according to image data entered therein. The localized light flux in spot 1 6 incident at a particular location on the surface of photoreceptor 18, corresponding to a picture element (pixel) in a small area of the desired image, discharges the surface for pixels of the desired image which are to be printed white in a charged-area development system (or, alternately, areas which are to be printed black in a discharged-area development system). In locations having pixels which are to be printed black, writing beam 12 is momentarily interrupted through the action of the modulator within source 10, so that the pixel at that location on the surface of photoreceptor 1 8 will not be discharged. Thus, digital data input into laser source 10 is rendered line by line as an electrostatic latent image on the surface of photoreceptor 18.

The rotational motion of polygon 14 results in a spot 16 moving across the surface of photoreceptor 18 to form a scan line 20 of selectively discharged pixel-sized areas on photoreceptor 18. At the same time, the surface of photoreceptor 18 is slowly translated at a constant velocity so that the periodic scanning of spot 16 across the moving photoreceptor 18 creates an evenly spaced closely spaced array of scan lines 20, called a raster 22, on the surface of photoreceptor 18, forming the desired continuous image to be printed. One skilled in the art will appreciate that such a configuration has traditionally further included any number of lenses, mirrors and translational mechanisms to accommodate a specific design.

Figure 2:
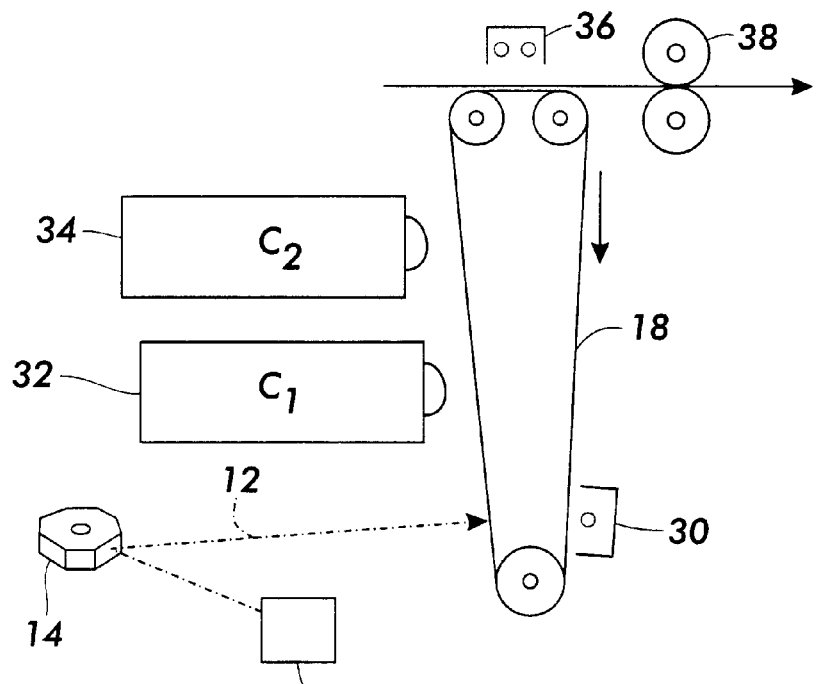
FIG. 2 is an elevational view showing the essential elements of a xerographic "laser" print engine wherein toner of a first type can be imagewise placed on an image comprising toner of a second type, such as in a color printer.

FIG. 2 is a simplified elevational view of the basic architecture for an image-on-image (IOI) type electrophotographic printer. In all Figures, like reference numerals indicate like elements. Thus, a laser source 10 reflects a laser beam 12 off the facets of a rotating polygon 14 to create an electrostatic latent image on a photoreceptor 18. Further as shown in FIG. 2, photoreceptor 18 rotates about a series of rollers so that a particular area of the surface of photoreceptor 18 can be recycled numerous times past the beam 12. Also disposed around the circumference of photoreceptor 18 are a charge corotron 30, which places a uniform charge on the main surface of photoreceptor 18 so that it may be imagewise discharged by laser beam 12; a plurality of development units, here indicated as 32 and 34; and a transfer corotron 36. As is generally known in the art of electrophotographic printing, the latent image created by the scanning of beam 12 is developed with one or the other development units 32 or 34, and then eventually the toner associated with the developed image is transferred at transfer corotron 36 to a sheet, such as a sheet of paper, which in turn is fused by a fuser generally indicated as 38.

As shown in the simplified diagram of FIG. 2, there are at least two development units 32 and 34 arranged along the length of photoreceptor 18, and one or the other development unit can be selectably activated to place a particular type of toner (or other marking material, such as liquid ink) in the suitably charged or discharged areas created by beam 12. As shown in the particular embodiment of FIG. 2, there are only two such development units, indicated as colors C1 and C2, but a typical full-color electrophotographic printer will have four such development units. However, for purposes of explaining the present invention, only two development units are shown.

In order to create a multicolor image on a particular area of photoreceptor 18, the area of photoreceptor 18 is cycled numerous times past charge corotron 30, beam 12, and the development units 32, 34. For a first cycle, to render portions of images which should be made in the color C1, the area of photoreceptor 18 is charged by corotron 30 and imagewise discharged by beam 12 in areas corresponding to those intended to have color C1 thereon. After imagewise discharge by beam 12, this area is moved past the activated development unit 32, which places toner of color C1 in the suitably charged or discharged areas. Then, in order to place the portions of the multicolor image corresponding to color C2 on essentially the same area of photoreceptor 18 (so that the two primary color images are in effect superimposed to create a multicolor image), the area of photoreceptor 18 is once again charged by charge corotron 30, and then discharged by beam 12 in areas corresponding to those desired to include color C2 therein. After discharging by beam 12, the area moves past development unit 32, which in this cycle is inactivated, and then to development unit 34 which is activated to convey toner of color C2 to the suitably charged or discharged areas on photoreceptor 18. Only after all of the desired colors are placed on the area of the photoreceptor desired to have the multicolor or full-color image is the complete set of toner layers (such as including toner of color C1 and color C2) transferred in one step with transfer corotron 36 onto a sheet. In a four-color system, the photoreceptor belt 18 must circulate four times, receiving a color each time, before the complete image is transferred in one step.

It will be apparent from the operation of an IOI electrophotographic printing apparatus such as in FIG. 2 that, for any imaging (charging, discharging with beam 12, then developing) cycle after the first cycle, the beam 12 will be caused to pass through at least one previously-placed layer of toner on the surface of photoreceptor 18 in order to discharge the photoreceptor 18. Even if the overall architecture is so designed that individual pixel-sized image areas for different primary colors are supposed to be spaced from one another on the photoreceptor surface, it is likely that, given the inherent mechanical instability of such a system, the beam 12 will still have to pass through one or more layers of toner. However, in order to provide for uniform discharging of the photoreceptor regardless of how many previous layers of toner have been placed thereon, the exposure of the laser should be increased where the laser must pass through one or more layers of toner. This increase in exposure can occur either by momentarily increasing the laser intensity, increasing the time duration of laser exposure for a particular pixel-sized area, or a combination of both techniques. It is a key function of the present invention to provide for a feedback-based real-time exposure control system which takes into account the possible presence of previous layers of toner and controls the exposure of the laser on a particular pixel-sized area accordingly.

Figure 3:
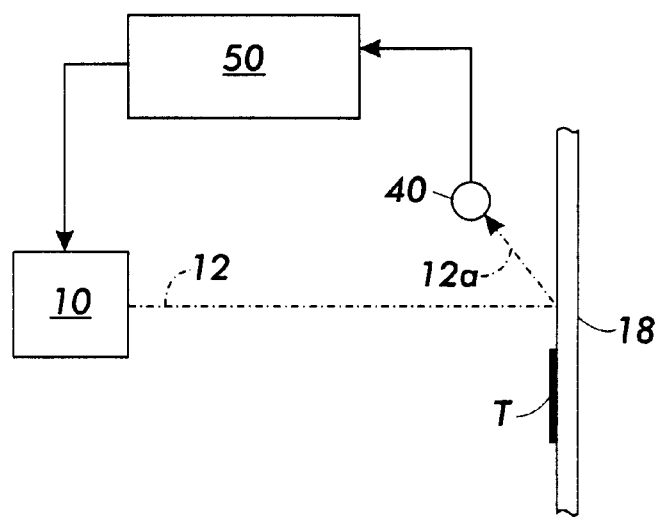
FIG. 3 is an elevational view showing the essential elements of one embodiment of the exposure control system of the present invention.
Figure 4:
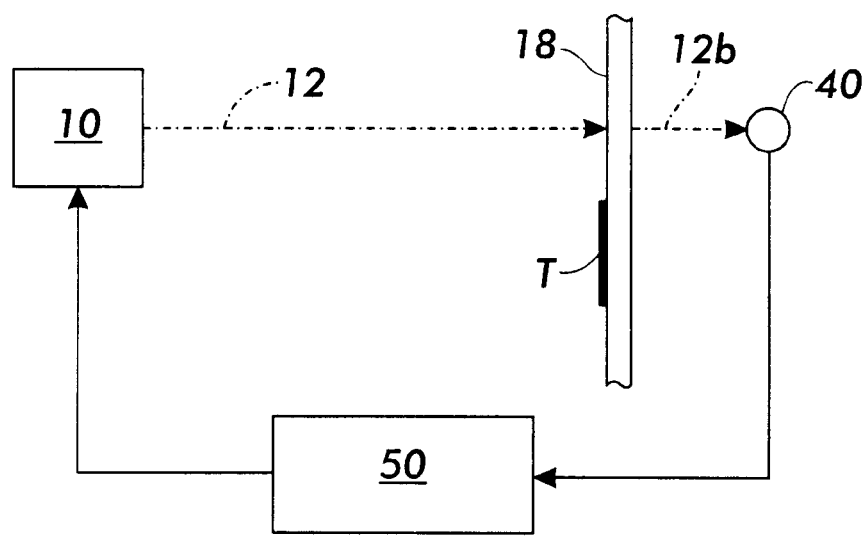
FIG. 4 is an elevational view showing the essential elements of another embodiment of the exposure control system of the present invention.

FIGS. 3 and 4 are, respectively, elevational views of a basic architecture for an apparatus for exposure control of a laser beam 12 from source 10 which is used to discharge a series of small areas on the surface of photoreceptor 18. In both cases, the surface of photoreceptor 18 has placed thereon, at unpredictable locations, areas of previously-placed toner indicated as T. The discharging behavior of the beam 12 will vary whether or not the beam 12 must pass through one or more toner layers T or not.

The present invention provides what is here called a "light collector" 40, which sends a signal representative of the light received thereon to a control system generally indicated as 50. Light collector 40 is an optical element of a design known in the art which conducts light received thereon to a desired location, in this case a photodetector which will be described in detail below. The control system 50 in turn controls the behavior of laser source 10 to control the real-time exposure of beam 12 on a small area of photoreceptor 18. Once again, this control may involve controlling either the power associated with beam 12, the pulse duration of beam 12, or both.

In the embodiment of FIG. 3, light collector 40 is placed in a position whereby a portion of beam 12 reflected against the surface of photoreceptor 18, indicated as 12a, is accepted by light collector 40. In the situation of FIG. 3, once photoreceptor 18 moves a small distance causing beam 12 to reflect not off the bare photoreceptor 18 but rather a toner layer T, that the amount of light being reflected to light collector 40 will be significantly changed, because the toner will have a different reflectivity than the bare surface of the photoreceptor. In brief, once a level of light within a predetermined range is reflected to light collector 40, the signal output associated with light collector 40 will affect the control system 50, which will in turn alter the exposure (typically, the power level and/or the pulse duration) associated with light source 10 while the beam 12 is still generally directed to the pixel area in question.

FIG. 4 shows an alternate arrangement of elements according to the present invention, wherein the light collector 40 is effectively disposed behind photoreceptor 18 but within the path of beam 12, so that a certain amount of light from beam 12, here indicated as 12b, will be transmitted through the translucent photoreceptor 18 and hit light collector 40. As can be seen, if a layer of toner T disposed on photoreceptor 18 blocks a quantity of light from beam 12 so that it does not reach light collector 40 with the same intensity, light collector 40 will ultimately affect control system 50 to cause light source 10 to compensate for the light blockage caused by toner layer T.

Figure 5:
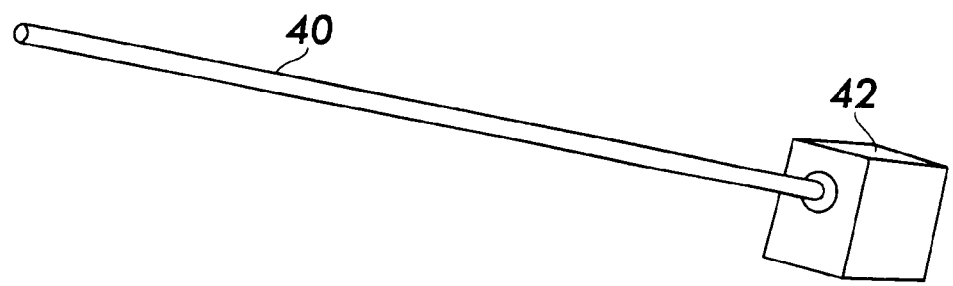
FIG. 5 is a perspective view showing, in isolation, a type of light collector which can be used in conjunction with the present invention.

FIG. 5 is a perspective view showing, in isolation, a light collector 40 associated with a photodetector generally indicated as 42. In FIGS. 3 and 4, the light collector 40, which is a small-diameter, elongated optical element, is meant to extend across the width of photoreceptor 18 in a position which is parallel to the direction of, for example, a scanline 20 as shown in FIG. 1 above. In this way, regardless of the specific position of the laser beam 12 at a particular time, a quantity of light either reflected from photoreceptor 18 or passing through photoreceptor 18 will hit the side of light collector 40 and be transferred to the relatively small photodetector 42 disposed at the end thereof. Although it is possible to simply provide a long, thin photodetector which extends across the width of photoreceptor 18, the use of a light collector which directs light to a small photodetector will cause a more pronounced change in output of the photodetector should an intervening layer or layers of toner alter the light reflected or passing through photoreceptor 18. In addition, the response time of a small detector at the end of a light collector is much faster than the response time of a long, thin detector extending across the width of the photoreceptor.

Two alternate designs of a light collector which would be useful in a practical embodiment of the present invention are disclosed respectively in U.S. Pat. Nos. 4,314,283 are 4,321,630, incorporated by reference above.

As mentioned above, control system 50 can be any system which allows for compensation of the measured intensity of beam 12, either by increasing the power thereof or increasing the pulse duration while the beam 12 is exposing a particular pixel area. One disclosure which discloses a practical system for effecting such exposure control is U.S. Pat. No. 5,497,181 assigned to the assignee hereof. Although the '181 disclosure discloses a photodetector disposed in the path of beam 12 between the source and the photoreceptor, the principle can be applied to the arrangement of a photodetector such as light collector 40 in the present invention.

Although the disclosed embodiment of the invention is directed to an apparatus which uses a laser and rotating polygonal mirror to expose a series of pixel-sized image areas on the photoreceptor, it is conceivable that the claimed invention could be applied to an apparatus having a different type of light source, such as an LED bar.

While the invention has been described with reference to the structure disclosed, it is not confined to the details set forth, but is intended to cover such modifications or changes as may come within the scope of the following claims.

I claim:

1. An electrophotographic printing apparatus, comprising:

a photosensitive member having a surface;

a light source;

means for placing marking material of a first type on the surface of the photosensitive member, thereby developing a first image scanline on the photosensitive member;

a light collector disposed to collect light from the light source interacting with the photosensitive member at an image area being exposed by the light source, the light collector outputting a signal related to intensity of the interacting light, thereby determining whether marking material of the first type was placed on said image area;

means for causing the light source to expose a plurality of image areas forming a second image scanline on the surface of the photosensitive member; and means for controlling the exposure of light from the light source on an image area when exposing the second image scanline, based on whether marking material of the first type was placed on said image area.

2. The apparatus of claim 1, the light collector disposed to collect light from the light source transmitted through the photosensitive member, and causing output of a signal related to an intensity of the transmitted light.

3. The apparatus of claim 1, the light collector extending parallel to the scanline and disposed to collect light from the light source reflected from the photosensitive surface, and causing output of a signal related to an intensity of the reflected light.

4. The apparatus of claim 1, the controlling means altering an intensity of light from the light source directed to the image area.

5. The apparatus of claim 1, the controlling means altering a duration of exposure of light from the light source directed to the image area.

6. The apparatus of claim 1, further comprising means for placing marking material of a second type on the surface of the photosensitive member, thereby developing the second image scanline on the photosensitive member.

* * * * *